United States Patent [19]

Meier

[11] 4,229,685
[45] Oct. 21, 1980

[54] ELECTRICAL CIRCUIT FOR REGULATING THE CURRENT IN THE WINDINGS OF CERTAIN STEP MOTORS

[75] Inventor: Walter Meier, Losone, Switzerland

[73] Assignee: A.G. für industrielle Elektronik AGIE Losone b. Locarno, Losone, Switzerland

[21] Appl. No.: 897,513

[22] Filed: Apr. 18, 1978

[30] Foreign Application Priority Data

Apr. 19, 1977 [CH] Switzerland .................. 4832/77

[51] Int. Cl.³ .............................................. G05B 19/40
[52] U.S. Cl. ................................................. 318/696
[58] Field of Search ........................................ 318/696

[56] References Cited
U.S. PATENT DOCUMENTS

| | | | |
|---|---|---|---|
| 3,748,554 | 7/1973 | McDonald | 318/696 |
| 3,812,413 | 5/1974 | Keidl | 318/696 |
| 3,824,440 | 7/1974 | McIntosh | 318/696 |
| 3,826,966 | 7/1974 | Nagasaka et al. | 318/696 |
| 3,885,210 | 5/1975 | Burnett | 318/696 |

Primary Examiner—J. V. Truhe
Assistant Examiner—Eugene S. Indyk
Attorney, Agent, or Firm—Frishauf, Holtz, Goodman & Woodward

[57] ABSTRACT

The disclosed circuit is for controlling step motors of the type which have access only to a common winding neutral point or to partial neutral points. A switching transistor switches a low-loss circuit into the motor drive circuit for free running of the motor. A common circuit common to all the windings is switched in for rapid switching off of the current in the windings and for recovery of the energy stored in the inductors of the circuits.

9 Claims, 10 Drawing Figures

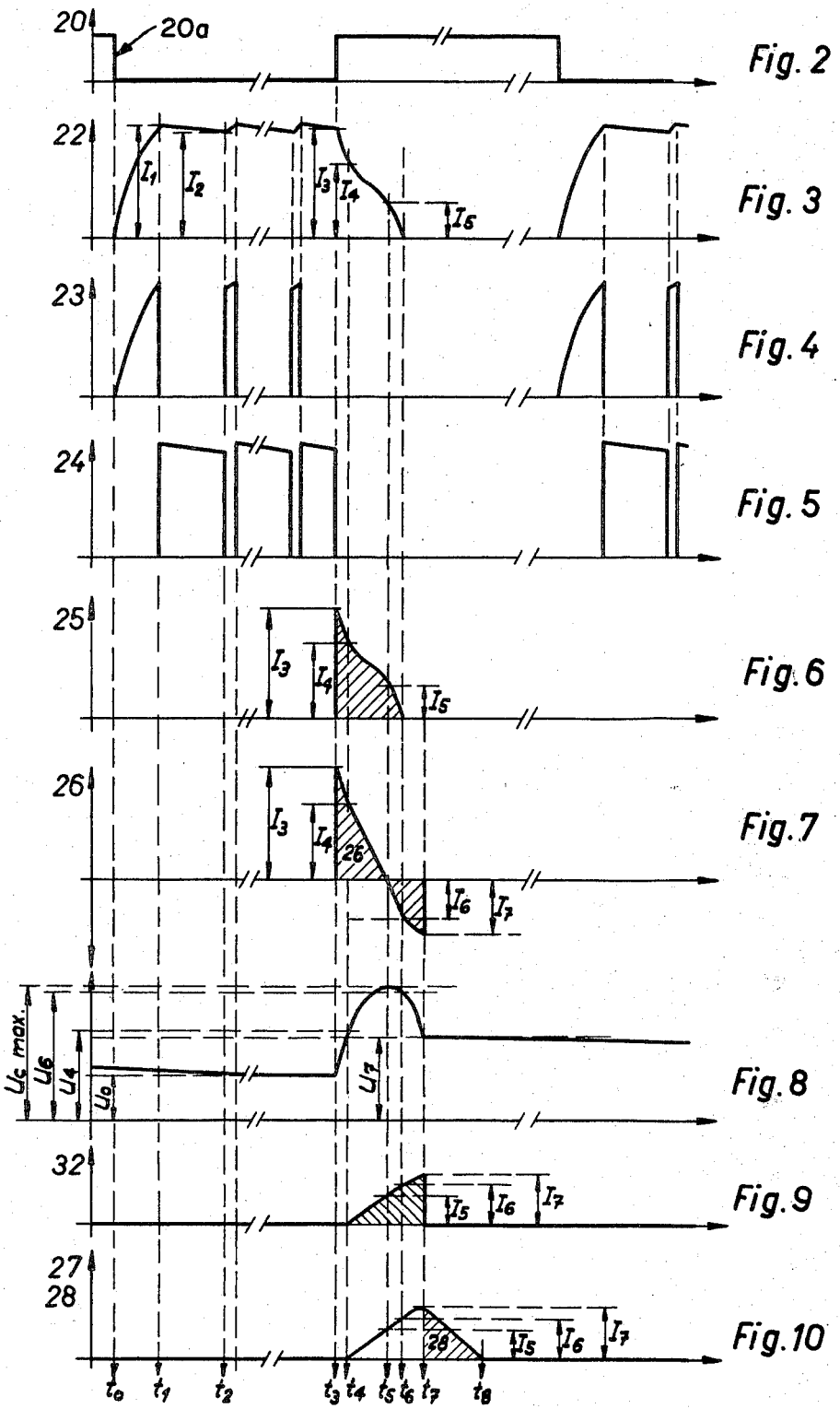

ELECTRICAL CIRCUIT FOR REGULATING THE CURRENT IN THE WINDINGS OF CERTAIN STEP MOTORS

BACKGROUND OF THE INVENTION

The invention relates to a circuit arrangement for regulating currents flowing through windings of stepping motors, the latter having access only to a common winding neutral point or to partial neutral points.

As is known, stepping motors are used as axle drives for machine tools, peripheral equipment for computers, and the like. Such stepping motors require a circuit which on the one hand permits the current in the individual motor windings to rapidly rise to the required value in the prescribed sequence, and on the other permits the current to drop to zero again after a given specified time.

A known circuit for fulfilling these requirements is an R-L circuit, in which an ohmic resistor is connected in series with the motor winding and a high voltage is applied to this combination.

The resistor has two actions. It limits the current to the necessary value and ensures a small motor time constant in accordance with the law $\tau = L/R$, leading to a rapid rise in current. In order to obtain a rapid breaking of the current, a resistor or a Zener diode is connected in series with a normal diode in the free running circuit. This circuit is described in the book entitled "Das Schrittmotoren-Handbuch" ("Stepping Motor Handbook") by the firm Sigma Instruments, European Office, vol. 1973, Publishers G. Schubert and C. Munich 5, *266223 on pages 46 ff. Circuits b, c and d described on page 47 of this book will not be considered here because they require the use of motors which permit separate access to all the ends of the windings.

Other circuits for motors with a neutral point use the chopper principle (described on page 58 of the above-cited handbook), but still use series resistors or Zener diodes in the free running circuit. The efficiency of such circuits is naturally low, because in the series resistors of the closed free running circuit the motor current produces dissipated heat.

It would be advantageous for stepping motors of the type which only permit access to the winding neutral point to have a circuit which permits a rapid switching ON of the current to the desired values, ensures small losses during the desired current flow time, and permits a rapid switching OFF of the current at a selected time with a similar high efficiency to that of the chopper circuits referred to above. However, in the latter circuit, free access to all the ends of the motor winding is assumed.

SUMMARY OF THE INVENTION

According to the present invention, during the desired current flow times of each individual motor winding, an electronic switch switches in a low-loss free running circuit and also a circuit common to all the motor windings for the rapid switching OFF of the current in the motor windings and for recovering the energy stored in the motor inductors.

With the novel arrangement in accordance with the present invention, motors which only give access to the winding neutral point and which are much cheaper from the manufacturing standpoint can be operated with substantially the same level of efficiency and substantially equally good dynamic and static characteristics as motors which permit electrical access to all the winding ends.

BRIEF DESCRIPTION OF THE DRAWINGS

An embodiment of the present invention is described in greater detail hereinafter with reference to the attached drawings, which show:

FIGS. 2 to 10 are graphical representations illustrating current and voltage forms at particular points of the circuit of FIG. 1.

DESCRIPTION OF A PREFERRED EMBODIMENT

Figure 1:
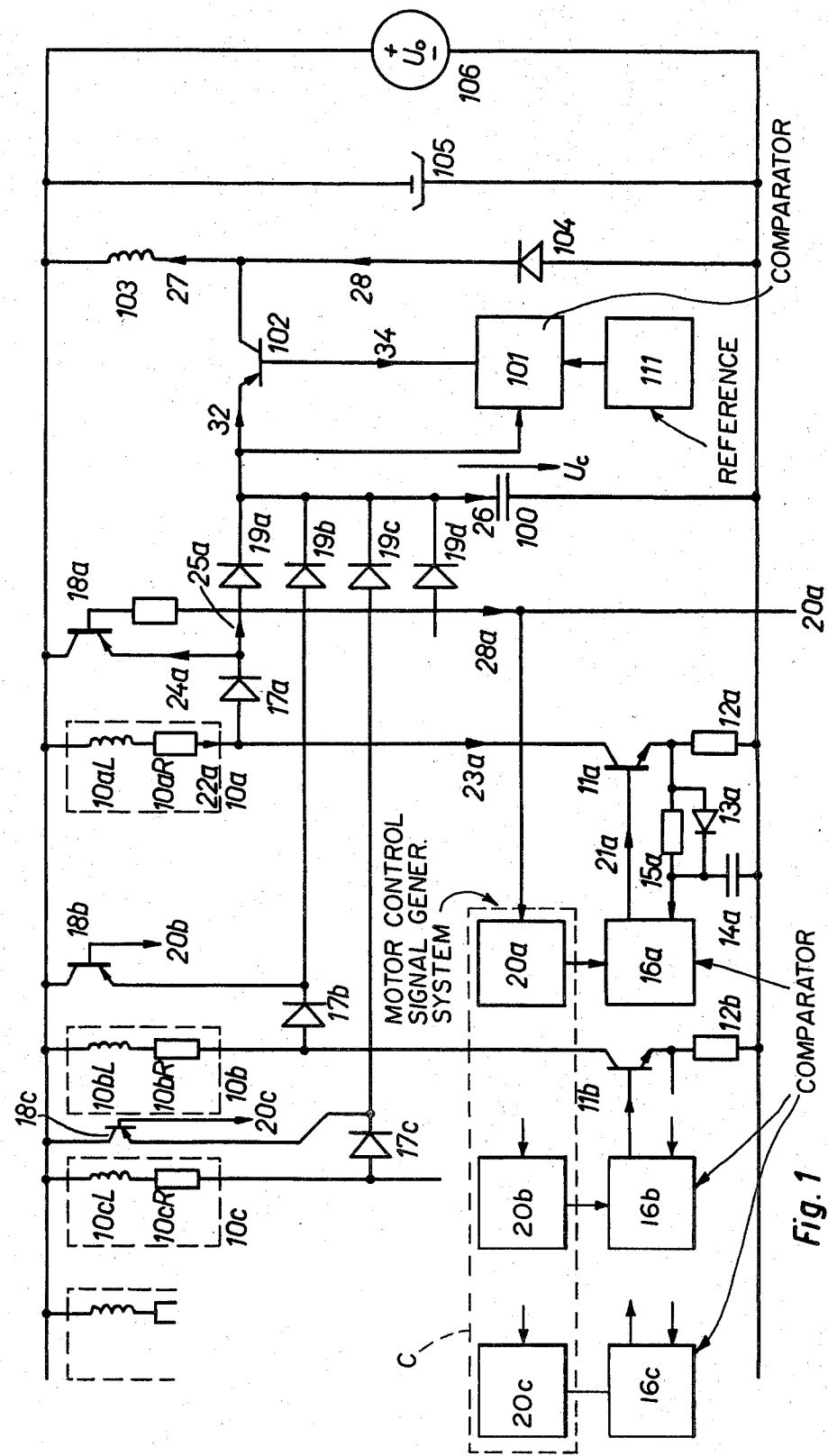
FIG. 1 is a diagram of a motor control circuit in accordance with a preferred embodiment of the present invention.

FIG. 1 shows outlined in broken line rectangles of the circuit components of the windings 10a, 10b, 10c, etc. of a stepping motor. A free running circuit comprising a respective free running diode 17a, 17b, 17c, etc. is placed parallel to each motor winding. By means of a respective transistor 18a, 18b, 18c, etc., the free running circuit is switched into or out of the circuit of the associated motor winding. Free running diode 17a, 17b, 17c, etc. is inserted in such a way that its anode is connected to one end of the motor winding and its cathode at the junction to the emitter of the associated transistor 18a, 18b, 18c, etc. as well as to isolation diode 19a, 19b, 19c, 19d, etc. The latter isolation diodes are positioned between each free running circuit and a common circuit for all the windings which includes a buffer capacitor 100, a transistor 102, an inductor 103, a free running diode 104, a main storage capacitor 105, and a comparator 101. In FIG. 1, each motor winding 10a, 10b, 10c has a current regulator circuit which, for reasons of simplicity, is only shown for motor winding 10a. It contains a comparator 16a, transistor 11a, resistors 12a and 15a, diode 13a, and capacitor 14a. The supply voltage for the motor windings is designated by 106. Hereinafter, the operation of the circuit of FIG. 1 is explained with reference to FIG. 1 and also to FIGS. 2 to 10.

It is assumed that there is provided an electronic logic motor control signal generating circuit C, shown schematically only and not forming part of the actual invention which emits a static logic motor control signal 20a for the first winding, then a signal 20b for the second winding, and so on. FIG. 2 shows such a control signal 20. If on a line carrying the control signal 20a the control signal 20a is changed from its value 1 to 0, then switch 18a closes at time t0, which prepares for the subsequent flow of the base current 28a. At the same time, the desired control current value 20a corresponding to the value I1 is given to the comparator 16a of the current regulator circuit by means of an inverter, which in the figure is in the block with the control current 20a denotation. At the same time, motor current 22a in winding 10a, shown in FIG. 3, starts to rise from zero, as a result of the flowing base current in line 21a, until precision resistor 12a, operating as a sensing resistor, reports to comparator 16a via diode 13a that the actual current value I1 corresponds to the desired line 20a value at time t1. At time t1, the base current 21a is interrupted, which immediately reduces the collector current 23a, shown in FIG. 4, to zero. As a result of the energy stored in motor inductor 10aL, the motor current 22a follows its path over diode 17a and the connected electronic switch 18a, whose current 24a is shown in FIG. 5, whereby, other than the voltage at the ohmic internal resistor 10a, it needs only develop a diode and a collector-emitter voltage drop at the saturated transistor or Darlington transistor 18a. Due to these small additional losses of the free running diode 17a and transistor 18a, the current in the motor winding 10a will only slowly drop to value I2 at time t2 (FIG. 3), approximately corresponding to the motor time constant $T_{mot}$ ($T_{mot}=L(10aL)/R(10aR)$). The base current 28a, which does not influence the logic signal in line 20a, also flows in the time interval t1, t2.

The voltage applied to capacitor 14a at the time t1 of opening switch 11a also falls in accordance with the electrical time constant $T_{meas}$($T_{meas}=C(14a)R(15a+12a)$) of RC circuit 12, 15a, 14a, which corresponds to the motor time constant $T_{mot}$ with switch 18a closed. When the capacitor voltage at capacitor 14a reaches a lower limit given by the adjustable hysteresis of comparator 16a at time t2, the base current 21a is switched on again, and therefore switch 11a is closed again, so that the supply power source 106 increases the motor current again from value Uo until the actual value I1 corresponding to desired control current 20a value is reached again. The processes corresponding to times t1 and t2 are repeated for as long as the control signal 20a maintains its value zero.

If, at time t3, the logic control signal 20a changes its value from zero to one, the base current 28a for switch 18a is interrupted. This leads to the opening of the latter, and the desired current value 20a at comparator 16a is reduced to zero, which also interrupts base current 21a and opens switch 11a. Motor current 22a now flows until time t4 via diode 17a to diode 19a, whose current 25 is shown in FIG. 6. From there it flows into buffer capacitor 100, whose current 26 is shown in FIG. 7. The circuit is closed via the supply power source 106. The energy taken from the motor inductor in time interval t3, t4 mainly passes to buffer capacitor 100, which is common to all the windings, so that naturally its voltage UC shown in FIG. 8 is increased.

If, at time t4, the capacitor voltage UC exceeds the value given to comparator 101 by reference circuit 111, switch 102 is closed by means of the base current 34 drawn through comparator 101. Motor current 22a is now subdivided and flows on the one hand (FIG. 7) in a decreasing manner until time t5 via elements 100, 106, 10a, 17a, 19a, and on the other hand in increasing manner from zero to time t5 as current 32 and 27 according to FIGS. 9 and 10 via elements 102, 103, 10a, 17a, 19a. At time t5, motor current 22a has dropped to value I5 and current 27 has risen in inductor 103 to value I5. Thus, at this time the current 26 of capacitor 100 has dropped to zero, and consequently its voltage maximum Uc max. is reached.

Voltage Uc at capacitor 100, which drops again from time t5, permits the current 27 in inductor 103 to rise again, whereby an increasing proportion of current 32 comes from capacitor 100, due to the high voltage and the rapidly falling motor current. Energy $\frac{1}{2}\cdot C\cdot(Uc^2max-U6^2)$ taken from buffer capacitor 100 in time interval t5, t6 is returned almost completely to main capacitor 105 via the circuit of elements 102, 103. At time t6, the motor current in the winding 10a has dropped to zero, which means that as of this time the large current flowing in inductor 103 flows back into main capacitor 105. In time interval t6, t7 the voltage Uc at buffer capacitor 100 still has a value which is higher than the value at comparator 101 given by the hysteresis and reference circuit 111. Thus, current 27 in inductor 103 rises to value 16 at time t7 (FIGS. 9 and 10), at which time switch 102 is opened again by means of comparator 101. The current 17 flowing in inductor 103 at time t7 now passes to the main capacitor 105 via diode 104. The linearly decreasing current 27, 28 transfers the energy stored in inductor 103 at time t7 almost completely into main capacitor 105 up to time t8.

The inductance value of inductor 103 should be at least comparable to that of the motor winding 10a in order to obtain a disconnecting function as described above. The operation of the circuit shown in FIG. 1 has been explained relative to a motor winding 10a. By means of an electronic logic circuit (not shown), the logic control signals 20b, 20c, etc. can be changed in corresponding manner from the value 1 to the value zero, as shown in FIG. 2. The currents in motor windings 10a, 10b, 10c, etc. can be switched off in a selected time sequence and frequency, provided that it is ensured that the necessary dielectric strength of the electronic switch is maintained and that the inductor 103 does not enter the saturation range.

I claim:

1. In a stepping motor control system, wherein the stepping motor is adapted to be connected to a source (106) of electrical energy, and has a plurality of windings (10a, 10b, 10c)

comprising, in accordance with the invention, the circuit combination of separate switch means (11a, 11b . . . ) connecting when closed, a respective winding to the source;

separate switch control means (20a, 20b . . . ) respectively connected to and controlling operation of the respective switch means;

a buffer capacitor (100);

coupling circuit means (17a, 17b . . . ; 19a, 19b . . . ) respectively connected to said respective windings and to the buffer capacitor to transfer stored electromagnetic energy in the respective windings to the buffer capacitor when, after energization of a respective winding, the respective switch means is controlled to open;

and a storage circuit (103, 104, 105) including a main storage capacitor, with charge sensing means (101, 111) connected to the buffer capacitor (106) and sensing when the charge accumulated thereon has reached a predetermined value;

and connecting circuit means including transfer switch means (102) controlled by the charge sensing means, interconnecting the buffer capacitor (100) and the storage circuit (103, 104, 105), the charge sensing means controlling the transfer switch means (102) to close when the charge on the buffer capacitor (100) has reached the predetermined value to transfer at least a portion of the charge thereon to the main storage capacitor (105), the charge sensing means controlling the transfer switch means to open when the charge level in the buffer capacitor has dropped, so that the buffer capacitor can then receive additional energy from the respective windings while being isolated from the storage circuit.

2. System according to claim 1 wherein the storage circuit includes an inductor (103).

3. System according to claim 2 wherein the inductance of the inductor is comparable to the inductance of any respective one motor winding.

4. System according to claim 1 wherein the storage circuit includes a series circuit comprising a diode (104) and an inductor (103) the main storage capacitor (105) being connected in parallel to said series circuit.

5. System according to claim 4 wherein the inductance of the inductor (103) is comparable to the inductance of any one respective winding.

6. System according to claim 1 wherein the charge sensing means comprises a comparator (101) connected to the buffer capacitor (100) and a reference source (111), the comparator comparing the voltage on the buffer capacitor with a voltage derived from said reference source.

7. System according to claim 6 wherein the storage circuit includes an inductor, the inductance of which is at least comparable to the inductance of any one of the respective motor windings.

8. System according to claim 1 wherein the coupling circuit means (17a, 17b . . . ; 19a, 19b . . . ) are all connected to a common terminal, and said common terminal is connected to the buffer capacitor (100) which is common to all said coupling circuit means and hence all said respective windings.

9. System according to claim 8 wherein the storage circuit includes an inductor, the inductance of which is at least comparable to the inductance of any one of the respective motor windings.

* * * * *